US006843279B1

(12) United States Patent
Ungemah

(10) Patent No.: US 6,843,279 B1
(45) Date of Patent: Jan. 18, 2005

(54) JACKETED PIPE INSULATION WITH INTEGRAL RULER

(75) Inventor: Donald W. Ungemah, Littleton, CO (US)

(73) Assignee: Johns Manville International, Inc., Denver, CO (US)

( * ) Notice: Subject to any disclaimer, the term of this patent is extended or adjusted under 35 U.S.C. 154(b) by 0 days.

(21) Appl. No.: 10/738,329

(22) Filed: Dec. 17, 2003

(51) Int. Cl.[7] ............................................. F16L 57/00
(52) U.S. Cl. ....................... 138/149; 138/156; 138/151; 138/DIG. 1; 138/128; 138/104; 428/40.1; 33/483; 33/755
(58) Field of Search ................................ 138/149, 156, 138/141, 151, 128, 110, DIG. 1, 104; 428/40.1, 41.8; 33/758, 484, 483, 832, 833, 755, 485

(56) References Cited

U.S. PATENT DOCUMENTS

| | | | | | |
|---|---|---|---|---|---|
| 1,811,984 | A | * | 6/1931 | Taft | 138/149 |
| 2,149,918 | A | * | 3/1939 | Komorous | 138/156 |
| 2,449,265 | A | * | 9/1948 | Williams | 138/118 |
| 3,092,530 | A | * | 6/1963 | Plummer | 138/151 |
| 3,941,159 | A | * | 3/1976 | Toll | 138/147 |
| 4,022,248 | A | | 5/1977 | Hepner et al. | 138/149 X |
| 4,243,453 | A | * | 1/1981 | McClintock | 156/152 |
| 4,264,388 | A | * | 4/1981 | McClintock | 156/152 |
| 4,584,217 | A | * | 4/1986 | McClintock | 428/41.8 |
| 4,605,043 | A | * | 8/1986 | Grenier | 138/149 |
| 4,606,957 | A | * | 8/1986 | Cohen | 428/40.9 |
| 4,748,060 | A | * | 5/1988 | Fry et al. | 428/36.9 |
| 4,772,507 | A | * | 9/1988 | Leo et al. | 428/218 |
| 4,778,700 | A | * | 10/1988 | Pereira | 428/41.7 |
| 4,927,696 | A | | 5/1990 | Berg | 428/195.1 |
| 4,996,088 | A | * | 2/1991 | Knittel et al. | 428/40.9 |
| 5,099,889 | A | * | 3/1992 | Ratzlaff | 138/110 |
| 5,123,453 | A | * | 6/1992 | Robbins | 138/149 |
| 5,141,793 | A | * | 8/1992 | Fontanilla | 428/40.4 |
| 5,421,371 | A | * | 6/1995 | Lauer | 138/110 |
| 5,666,737 | A | * | 9/1997 | Ryan, III | 33/562 |
| 5,699,828 | A | * | 12/1997 | Helmsderfer | 137/375 |
| 5,771,941 | A | * | 6/1998 | Almeida | 138/149 |
| 5,915,413 | A | * | 6/1999 | Helmsderfer | 137/375 |
| 5,964,252 | A | * | 10/1999 | Simmons et al. | 138/149 |
| 6,403,182 | B1 | * | 6/2002 | Plummer et al. | 428/36.9 |
| 6,460,576 | B2 | * | 10/2002 | Vitoorapakorn | 138/149 |
| 6,560,887 | B2 | * | 5/2003 | Byrnes | 33/534 |

* cited by examiner

Primary Examiner—Patrick Brinson
(74) Attorney, Agent, or Firm—Robert D. Touslee

(57) ABSTRACT

A pipe insulation assembly includes a length of tubular insulation with a longitudinally extending slit so that the tubular insulation can be passed over and mounted on a length of pipe and a jacket overlaying the outer surface of the tubular insulation. To facilitate the installation of the pipe insulation assembly, a ruler, which is associated with the jacket and, preferably, no longer visible when the pipe insulation is mounted on a pipe, extends for the length of the jacket and is located adjacent the slit in the tubular insulation. The ruler has units of linear measurement marked thereon for measuring the pipe insulation assembly in the direction of the length of the pipe insulation assembly.

19 Claims, 4 Drawing Sheets

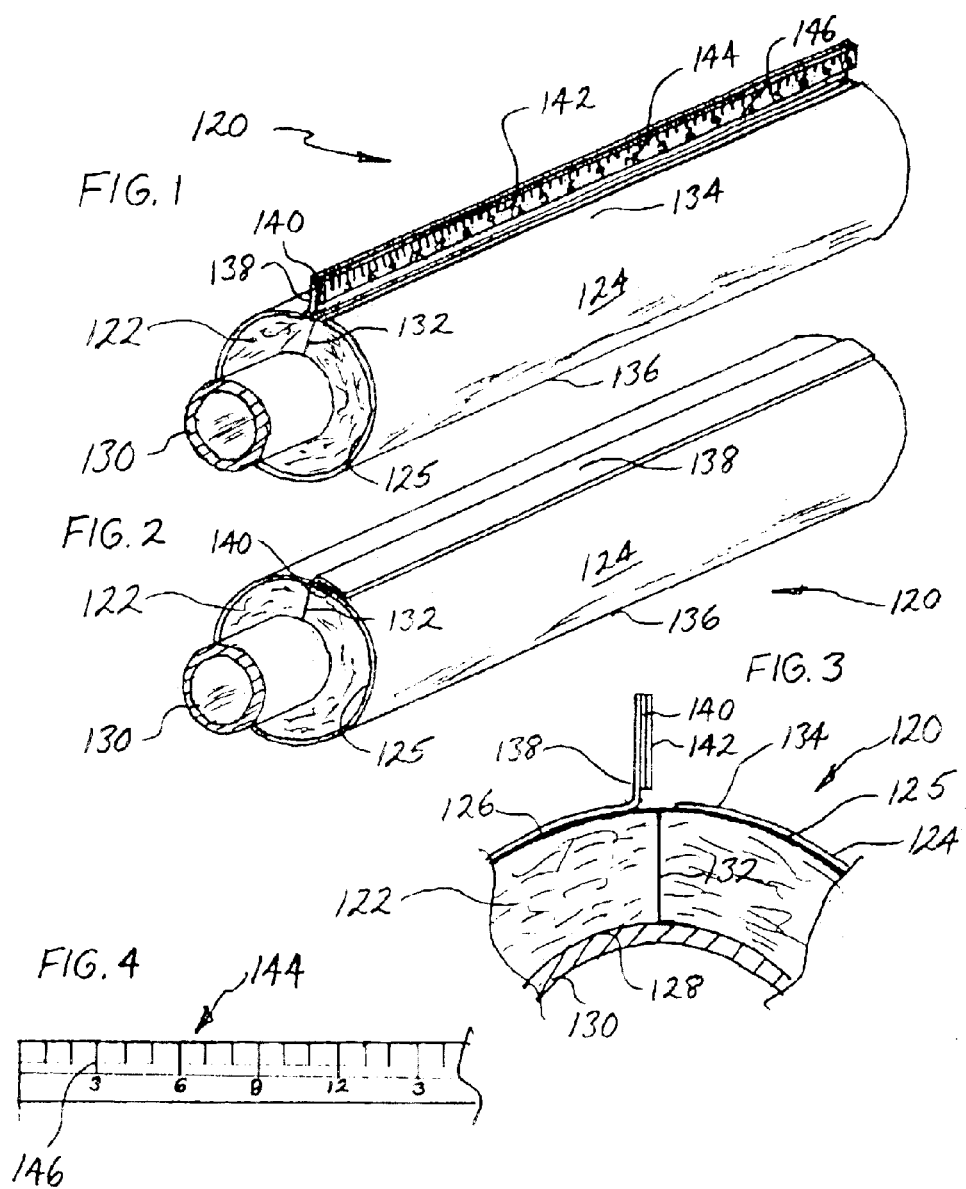

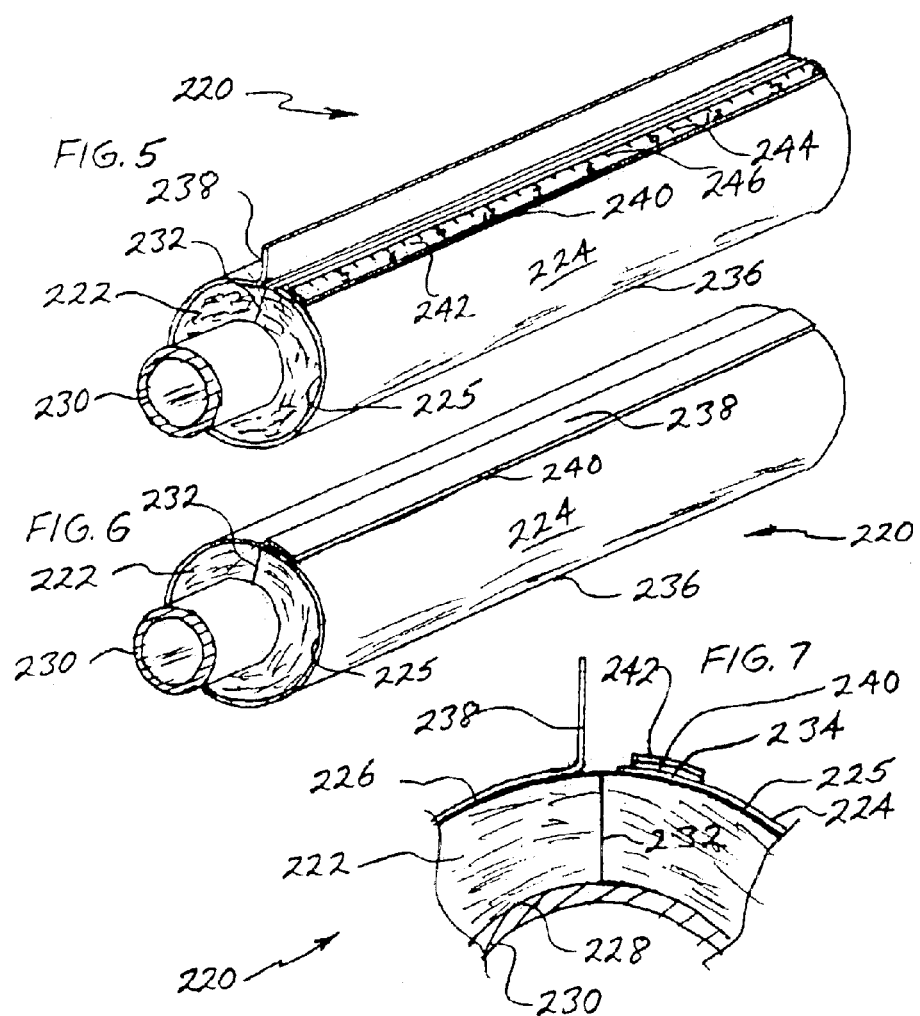

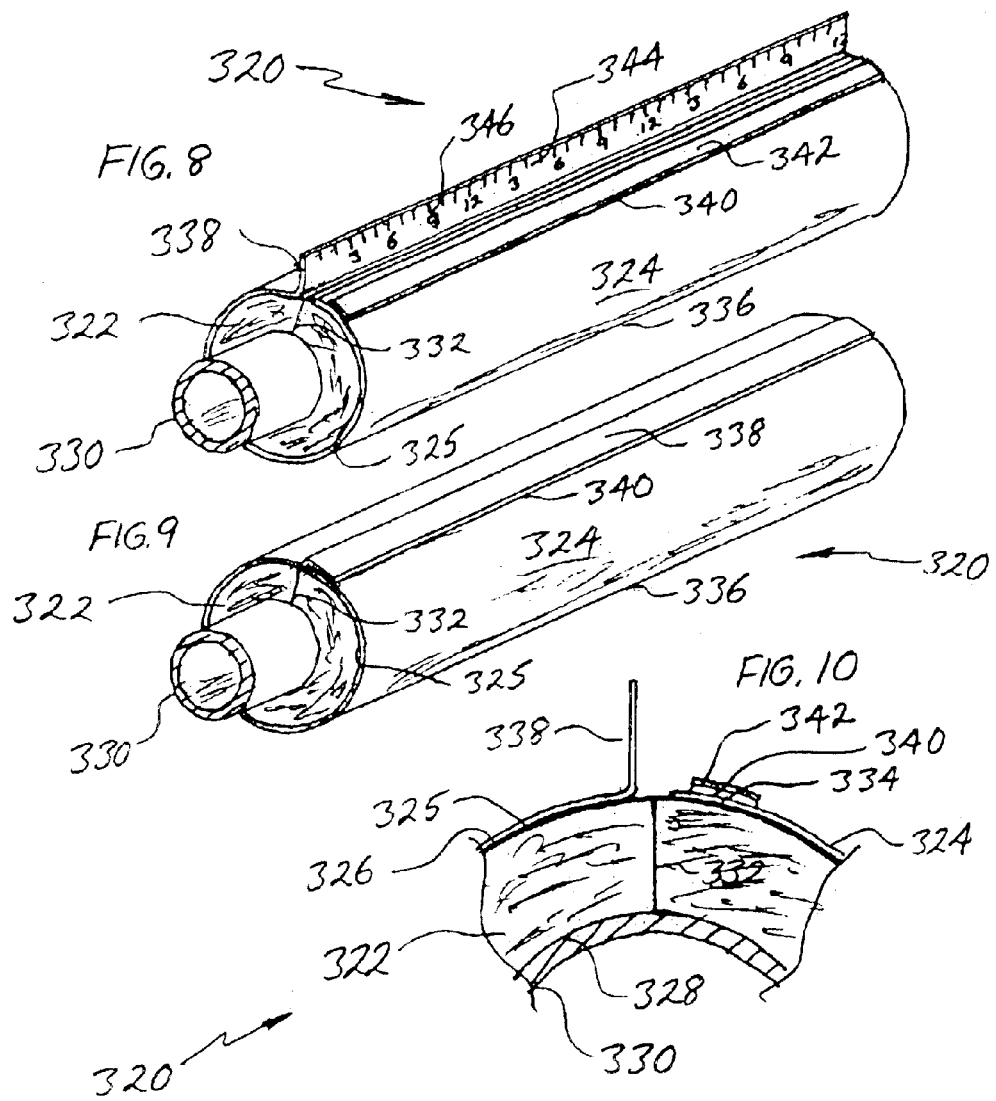

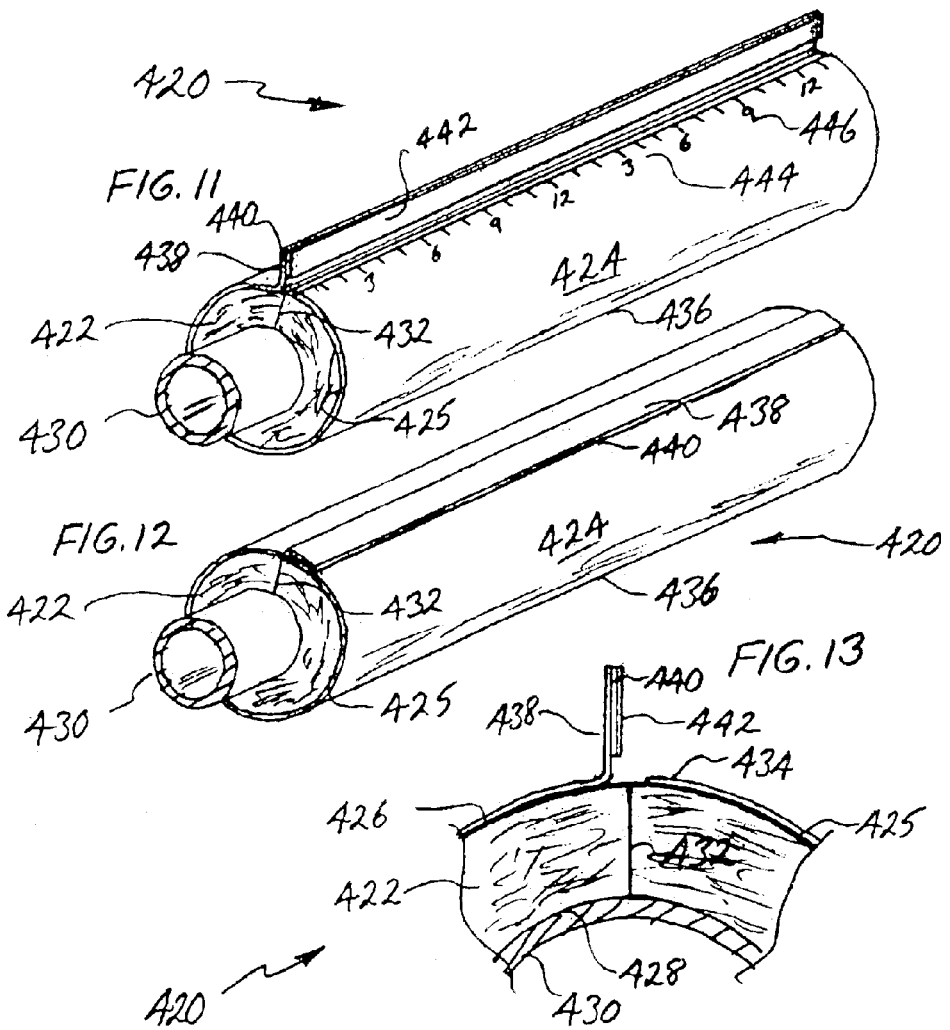

JACKETED PIPE INSULATION WITH INTEGRAL RULER

BACKGROUND OF THE INVENTION

The subject invention relates to a pipe insulation assembly that includes a length of tubular insulation with a longitudinally extending slit so that the tubular insulation can be passed over and mounted on a length of pipe and a jacket overlaying the outer surface of the tubular insulation. To facilitate the installation of the pipe insulation assembly, a ruler, which is associated with the jacket and preferably no longer visible after the pipe insulation assembly is mounted on a length of pipe, extends for the length of the jacket and is located adjacent the slit in the tubular insulation. The ruler has units of linear measurement marked thereon for measuring the pipe insulation assembly in the direction of the length of the pipe insulation assembly.

Pipe insulation assemblies, like or similar to the pipe insulation assembly shown in U.S. Pat. No. 4,022,248, issued May 10, 1977, are typically produced in lengths of 36 inches (0.92 m), 47.2 inches (1.2 m), and 48 inches (1.22 m). When smaller lengths or sections of pipe insulation than those manufactured are needed to conform to a specific application, the manufactured pipe insulation assemblies must be cut to form the smaller lengths or sections of pipe insulation from the manufactured pipe insulation assemblies (e.g. a manufactured pipe insulation assembly of 36 inches must be cut to a form a section of pipe insulation 29 inches in length). Currently, for the installer to accomplish this task, the installer typically uses a tape measure or folding rule to measure the length of uninsulated pipe to be fitted with the insulation and then again uses the tape measure or folding rule to measure the manufactured pipe insulation and sight where the pipe insulation is to be cut to form a length of pipe insulation to be fitted on the uninsulated length of pipe. The use of a tape measure or similar measuring tool to make multiple measurements and sight where a manufactured pipe insulation should be cut to form a section of pipe insulation having the correct length can give rise to installer error especially where the installer is not skilled. Furthermore, this procedure is not conducive to high rates of productivity and may require the additional measurements to be made while the installer in located on a ladder or scaffold or in another location where the need to make the additional measurements quickly and accurately raises safety risks.

As exemplified by U.S. Pat. No. 4,927,696, issued May 22, 1990, board products such as plywood, linear products such as boards, and roll goods such as carpet have been marked with reference markings that can be used for measurement. However, pipe insulation assemblies have continued to be manufactured and sold without markings so that, currently, pipe insulation installers continue: to make multiple measurements at the job site with a tape measure or similar measuring instrument; to sight where the cut is to be made on the manufactured pipe insulation prior to making each cut; and to then cut a length manufactured pipe insulation to form a shorter length or section of pipe insulation.

SUMMARY OF THE INVENTION

The pipe insulation assembly of the subject invention solves the problems discussed above that are currently encountered in the installation of pipe insulation assemblies by providing a pipe insulation assembly with an integral, easy to locate, ruler thereon for easily and accurately measuring the length of a pipe insulation section to be formed by cutting the section from a manufactured pipe insulation assembly. The pipe insulation assembly of the subject invention includes: a length of tubular insulation having a longitudinally extending slit so that the tubular insulation can be passed over and mounted on a length of pipe and a jacket overlaying and bonded to the outer surface of the tubular insulation. To facilitate the installation of the pipe insulation assembly, a ruler, which is associated with the jacket, extends for the length of the jacket and is located adjacent the slit in the tubular insulation so that it can be easily located. The ruler has units of linear measurement marked thereon for measuring the pipe insulation assembly and sections of the pipe insulation assembly in the direction of the length of the pipe insulation assembly.

The jacket has a first lateral edge portion that extends along a first edge of the slit and an intermediate portion that passes around the outer surface of the tubular insulation to a second lateral edge portion of the jacket that is located in proximity to and extends for the length a second edge of the slit. The second lateral edge portion forms a longitudinally extending flap for overlapping the slit and the first lateral edge portion of the jacket to seal the pipe insulation assembly or a section of the pipe insulation assembly about a length of pipe. Adhesive is located on at least one of the lateral edge portions of the jacket for bonding the lateral edge portions of the jacket together, with the flap overlaying and sealing the slit, after the pipe insulation assembly or a section of the pipe insulation assembly has been mounted on a length of pipe. A release strip overlays the adhesive and protects the adhesive from degradation prior to installation. The release strip is removed from the adhesive immediately prior to bonding the lateral edge portions of the jacket together to seal the jacket and the pipe insulation assembly or section of the pipe insulation assembly about a length of pipe on which the pipe insulation assembly or section of the pipe insulation assembly has been mounted. Preferably, the ruler is formed by: a) markings on the release strip so that the ruler will not be visible when the pipe insulation assembly or a section of the pipe insulation assembly is mounted on and sealed about a length of pipe; b) markings on the outer surface of the first lateral edge portion of the jacket that will be covered by the jacket flap when the pipe insulation assembly or a section of the pipe insulation assembly is mounted on and sealed about a length of pipe so that the ruler will not be visible when the pipe insulation assembly or a section of the pipe insulation assembly is mounted on and sealed about a length of pipe; or c) markings on the inner surface of the jacket flap formed by the second lateral edge portion of the jacket so that the ruler will not be visible when the pipe insulation assembly or a section of the pipe insulation assembly is mounted on and sealed about a length of pipe.

BRIEF DESCRIPTION OF THE DRAWINGS

FIG. 1 is a partial perspective view of a first embodiment of the pipe insulation assembly of the subject invention with the integral ruler on the release strip that overlays the adhesive on the flap formed by the second lateral edge portion of the insulation jacket.

FIG. 2 is a partial perspective view of the pipe insulation assembly of FIG. 1 installed on a length of pipe.

FIG. 3 is a partial end view, on a larger scale than FIG. 1, of the pipe insulation assembly of FIG. 1.

FIG. 4 is a partial view of preferred markings for the ruler of the subject invention.

FIG. 5 is a partial perspective view of a second embodiment of the pipe insulation assembly of the subject invention with the integral ruler on the release strip that overlays the adhesive on the first lateral edge portion of the insulation jacket.

FIG. 6 is a partial perspective view of the pipe insulation assembly of FIG. 5 installed on a length of pipe.

FIG. 7 is a partial end view, on a larger scale than FIG. 5, of the pipe insulation assembly of FIG. 5.

FIG. 8 is a partial perspective view of a third embodiment of the pipe insulation assembly of the subject invention with the integral ruler on an inner surface of the flap formed by the second lateral edge portion of the insulation jacket.

FIG. 9 is a partial perspective view of the pipe insulation assembly of FIG. 8 installed on a length of pipe.

FIG. 10 is a partial end view, on a larger scale than FIG. 8, of the pipe insulation assembly of FIG. 8.

FIG. 11 is a partial perspective view of a fourth embodiment of the pipe insulation assembly of the subject invention with the integral ruler on an outer surface of the first lateral edge portion of the insulation jacket.

FIG. 12 is a partial perspective view of the pipe insulation assembly of FIG. 11 installed on a length of pipe.

FIG. 13 is a partial end view, on a larger scale than FIG. 11, of the pipe insulation assembly of FIG. 11.

DESCRIPTION OF THE PREFERRED EMBODIMENTS

The pipe insulation assembly of the subject invention includes: a length of tubular insulation having with a longitudinally extending slit so that the tubular insulation can be passed over and mounted on a length of pipe and a jacket overlaying and bonded to the outer surface of the tubular insulation. To facilitate the installation of the pipe insulation assembly, a ruler, which is associated with the jacket, extends for the length of the jacket and is located adjacent the slit in the tubular insulation so that it can be easily located. The ruler has units of linear measurement marked thereon for measuring the pipe insulation assembly and sections of the pipe insulation assembly in the direction of the length of the pipe insulation assembly. When the pipe insulation assembly is installed over a length of pipe, the ruler is either removed or covered so that the ruler does not adversely affect the appearance of the insulated pipe.

The length of tubular insulation used in the pipe insulation assembly of the subject invention may be made of various insulation materials, such as but not limited to fiberglass, mineral wool, and/or other fibrous insulation materials or foam insulation materials. However, fiberglass is a preferred insulation material. For example, the tubular insulation of the pipe insulation assembly of the subject invention may be made from glass fibers bonded together with a thermosetting resin, such as the tubular insulation used in a jacketed pipe insulation marketed by Johns Manville International, Inc., under the trade designation Micro-Lok® fiber glass pipe insulation. Jacketed pipe insulation such as Micro-Lok® pipe insulation is suitable for installation over hot, cold, concealed and exposed piping systems with operating temperatures ranging from 0° F. (−18° C.) to 850° F. (454° C.). Jacketed pipe insulation such as Micro-Lok® pipe insulation is currently marketed in lengths of 36 inches (0.92 m), 47.2 inches (1.2 m), and 48 inches (1.22 m); and in wall thicknesses ranging from 0.5 inches (1.27 cm) to 3 inches (7.62 cm) for insulating pipe having nominal outside diameters ranging from 0.5 to 8 inches (13 to 203 cm).

Preferably, the jacket of the pipe insulation assembly of the subject invention that overlays and is bonded to the outer surface of the length of tubular insulation functions as a vapor retarder and is made from a reinforced facing material, such as but not limited to a scrim reinforced polymeric sheet material.

The first embodiment 120 of the pipe insulation assembly of the subject invention that is shown in FIGS. 1 to 4 includes a length of tubular insulation 122 and a jacket 124 overlaying and bonded by an adhesive 125 to the outer surface of the tubular insulation. The length of tubular insulation 122 has a wall with an outer cylindrical surface 126 and an inner cylindrical surface 128 for overlaying an outer surface of a length of pipe 130. In a preferred embodiment, a longitudinally and radially extending slit 132 extends from the outer surface to the inner surface of the wall and for the length of the wall so that the pipe insulation assembly 120 can be easily flexed open, passed over, and mounted on the length of pipe 130. Where the tubular insulation 122 is less flexible or more flexibility is desired for passing the pipe insulation assembly over a pipe, the slit 132 may also extend part of the way through a diametrically opposed portion of the wall to provide the pipe insulation assembly 120 with more flexibility for being opened, passed over, and mounted on a length of pipe 130 or the slit 132 may extend completely through a diametrically opposed portion of the wall to sever the tubular insulation 122 into two sections with the jacket 124 holding the sections together and providing the pipe insulation assembly with more flexibility for being opened, passed over, and mounted on a length of pipe 130.

The jacket 124 has a first lateral edge portion 134 that extends along a first outer edge of the slit 132 and has an intermediate portion 136 that passes around the outer surface of the tubular insulation 122 to a second lateral edge portion 138 of the jacket that is located in proximity to and extends for the length a second outer edge of the slit 132. The second lateral edge portion 138 forms a longitudinally extending flap for overlapping the slit 132 and the first lateral edge portion 134 of the jacket to seal the pipe insulation assembly 120 or a section of the pipe insulation assembly 120 about a length of pipe 130. A continuous or discontinuous strip or layer of adhesive 140 is located on an inner surface of the flap and extends for the length of the flap formed by the second lateral edge portion 138 of the jacket. As shown in FIG. 2, the strip or layer of adhesive 140 is used to bond the lateral edge portions 134 and 138 of the jacket 124 together, with the flap overlaying and sealing the slit 132, after the pipe insulation assembly 120 or a section of the pipe insulation assembly 120 has been mounted on a length of pipe 130. Preferably, the adhesive 140 is a pressure sensitive adhesive, such as but not limited to an acrylic adhesive, that enables the lateral edge portions 134 and 138 of the jacket 124 to be sealed together by pressing the adhesive on the inner surface of the flap formed by the second lateral edge portion firmly against the outer surface of the first lateral edge portion 134.

During the packaging, storage, shipment, and handling of the pipe insulation assembly 120 prior to installation, a release strip 142 overlays the adhesive 140 on the inner surface of the flap formed by the second lateral edge portion of the jacket 124 and protects the adhesive 140 from degradation that could otherwise be caused by an accumulation of dirt or water on or by the adhesive 140 prior to installation. The release strip 142 is removed from the adhesive 140 immediately prior to bonding the lateral edge portions of the jacket 124 together to seal the jacket 124 and the pipe insulation assembly 120 or section of the pipe insulation assembly 120 about a length of pipe 130 on which the pipe insulation assembly or section of the pipe insulation assembly has been mounted.

The release strip 142 may be made of paper, polymeric film or other suitable strip material and has a release agent, such as but not limited to silicone, on the surface directly overlaying the adhesive 140 that permits the release strip to be easily peeled back and removed from the adhesive 140 immediately prior to sealing the lateral edge portions of the jacket 124 together to complete the installation of the pipe insulation assembly or a section of the pipe insulation assembly about a length of pipe 130. A ruler 144 for measuring the length of pipe insulation section(s) made by transversely cutting the pipe insulation assembly 120 is formed by easily visible markings 146, in units of linear measurement, printed or otherwise formed on the release strip 142. The markings may be in English system units (e.g. at one inch or half inch increments) or metric units (e.g. at two or five centimeter increments). For example, as shown in FIG. 4, the unit markings may be in one inch increments with each third marking having a numerical indicator wherein the numerical indicators follow a sequence that begins with 3 and incrementally increases by 3 from 3 to 12 after which the sequence is repeated for the length of the ruler. To size and install a section of the pipe insulation assembly 120, an installer merely has to measure the length of pipe to be insulated; read the ruler provided on the pipe insulation assembly to determine where the pipe insulation assembly should be transversely cut to form a pipe insulation section of the correct length; make the cut; and install the properly sized pipe insulation section. Since the release strip 142 is removed from the pipe insulation section installed, there are no visible ruler markings on the installed section of pipe insulation to adversely affect the appearance of the insulated pipe.

The second embodiment 220 of the pipe insulation assembly of the subject invention that is shown in FIGS. 5, 6, and 7 includes a length of tubular insulation 222 and a jacket 224 overlaying and bonded by an adhesive 225 to the outer surface of the tubular insulation. The length of tubular insulation 222 has a wall with an outer cylindrical surface 226 and an inner cylindrical surface 228 for overlaying an outer surface of a length of pipe 230. In a preferred embodiment, a longitudinally and radially extending slit 232 extends from the outer surface to the inner surface of the wall and for the length of the wall so that the pipe insulation assembly 220 can be easily flexed open, passed over, and mounted on the length of pipe 230. Where the tubular insulation 222 is less flexible or more flexibility is desired for passing the pipe insulation assembly over a pipe, the slit 232 may also extend part of the way through a diametrically opposed portion of the wall to provide the pipe insulation assembly 220 with more flexibility for being opened, passed over, and mounted on a length of pipe 230 or the slit 232 may extend completely through a diametrically opposed portion of the wall to sever the tubular insulation 222 into two sections with the jacket 224 holding the sections together and providing the pipe insulation assembly with more flexibility for being opened, passed over, and mounted on a length of pipe 230.

The jacket 224 has a first lateral edge portion 234 that extends along a first outer edge of the slit 232 and has an intermediate portion 236 that passes around the outer surface of the tubular insulation 222 to a second lateral edge portion 238 of the jacket that is located in proximity to and extends for the length a second outer edge of the slit 232. The second lateral edge portion 238 forms a longitudinally extending flap for overlapping the slit 232 and the first lateral edge portion 234 of the jacket to seal the pipe insulation assembly 220 or a section of the pipe insulation assembly 220 about a length of pipe 230. A continuous or discontinuous strip or layer of adhesive 240 is located on an outer surface of the first lateral edge portion and extends for the length of the first lateral edge portion 234 of the jacket. As shown in FIG. 6, the strip or layer of adhesive 240 is used to bond the lateral edge portions 234 and 238 of the jacket 224 together, with the flap overlaying and sealing the slit 232, after the pipe insulation assembly 220 or a section of the pipe insulation assembly 220 has been mounted on a length of pipe 230. Preferably, the adhesive 240 is a pressure sensitive adhesive, such as but not limited to an acrylic adhesive, that enables the lateral edge portions 234 and 238 of the jacket 224 to be sealed together by pressing the flap formed by the second lateral edge portion firmly against the strip or layer of adhesive 240 on the outer surface of the first lateral edge portion 234.

During the packaging, storage, shipment, and handling of the pipe insulation assembly 220 prior to installation, a release strip 242 overlays the adhesive 240 on the outer surface of the first lateral edge portion of the jacket 224 and protects the adhesive 240 from degradation that could otherwise be caused by an accumulation of dirt or water on or by the adhesive 240 prior to installation. The release strip 242 is removed from the adhesive 240 immediately prior to bonding the lateral edge portions of the jacket 224 together to seal the jacket 224 and the pipe insulation assembly 220 or section of the pipe insulation assembly 220 about a length of pipe 230 on which the pipe insulation assembly or section of the pipe insulation assembly has been mounted.

The release strip 242 may be made of paper, polymeric film or other suitable strip material and has a release agent, such as but not limited to silicone, on the surface directly overlaying the adhesive 240 that permits the release strip to be easily peeled back and removed from the adhesive 240 immediately prior to sealing the lateral edge portions of the jacket 224 together to complete the installation of the pipe insulation assembly or a section of the pipe insulation assembly about a length of pipe 230. A ruler 244 for measuring the length of pipe insulation section(s) made by transversely cutting the pipe insulation assembly 220 is formed by easily visible markings 246, in units of linear measurement, printed or otherwise formed on the release strip 242. The markings may be in English system units (e.g. at one inch or half inch increments) or metric units (e.g. at two or five centimeter increments). For example, like the ruler 144 of the first embodiment, unit markings may be in one inch increments with each third marking having a numerical indicator wherein the numerical indicators follow a sequence that begins with 3 and incrementally increases by 3 from 3 to 12 after which the sequence is repeated for the length of the ruler. To size and install a section of the pipe insulation assembly 220, an installer merely has to measure the length of pipe to be insulated; read the ruler provided on the pipe insulation assembly to determine where the pipe insulation assembly should be transversely cut to form a pipe insulation section of the correct length; make the cut; and install the properly sized pipe insulation section. Since the release strip 242 is removed from the pipe insulation section installed, there are no visible ruler markings on the installed section of pipe insulation to adversely affect the appearance of the insulated pipe.

The third embodiment 320 of the pipe insulation assembly of the subject invention that is shown in FIGS. 8, 9, and 10 includes a length of tubular insulation 322 and a jacket 324 overlaying and bonded by an adhesive 325 to the outer surface of the tubular insulation. The length of tubular insulation 322 has a wall with an outer cylindrical surface 326 and an inner cylindrical surface 328 for overlaying an outer surface of a length of pipe 330. In a preferred embodiment, a longitudinally and radially extending slit 332 extends from the outer surface to the inner surface of the wall and for the length of the wall so that the pipe insulation assembly 320 can be easily flexed open, passed over, and mounted on the length of pipe 330. Where the tubular insulation 322 is less flexible or more flexibility is desired for passing the pipe insulation assembly over a pipe, the slit 332 may also extend part of the way through a diametrically opposed portion of the wall to provide the pipe insulation assembly 320 with more flexibility for being opened, passed over, and mounted on a length of pipe 330 or the slit 332 may extend completely through a diametrically opposed portion of the wall to sever the tubular insulation 322 into two sections with the jacket 324 holding the sections together and providing the pipe insulation assembly with more flexibility for being opened, passed over, and mounted on a length of pipe 330.

The jacket 324 has a first lateral edge portion 334 that extends along a first outer edge of the slit 332 and has an intermediate portion 336 that passes around the outer surface of the tubular insulation 322 to a second lateral edge portion 338 of the jacket that is located in proximity to and extends for the length a second outer edge of the slit 332. The second lateral edge portion 338 forms a longitudinally extending flap for overlapping the slit 332 and the first lateral edge portion 334 of the jacket to seal the pipe insulation assembly 320 or a section of the pipe insulation assembly 320 about a length of pipe 330. A continuous or discontinuous strip or layer of adhesive 340 is located on an outer surface of the first lateral edge portion and extends for the length of the first lateral edge portion 334 of the jacket. As shown in FIG. 9, the strip or layer of adhesive 340 is used to bond the lateral edge portions 334 and 338 of the jacket 324 together, with the flap overlaying and sealing the slit 332, after the pipe insulation assembly 320 or a section of the pipe insulation assembly 320 has been mounted on a length of pipe 330. Preferably, the adhesive 340 is a pressure sensitive adhesive, such as but not limited to an acrylic adhesive, that enables the lateral edge portions 334 and 338 of the jacket 324 to be sealed together by pressing the flap formed by the second lateral edge portion 338 firmly against the strip or layer of adhesive 340 on the outer surface of the first lateral edge portion 334.

During the packaging, storage, shipment, and handling of the pipe insulation assembly 320 prior to installation, a release strip 342 overlays the adhesive 340 on the outer surface of the first lateral edge portion of the jacket 324 and protects the adhesive 340 from degradation that could otherwise be caused by an accumulation of dirt or water on or by the adhesive 340 prior to installation. The release strip 342 is removed from the adhesive 340 immediately prior to bonding the lateral edge portions of the jacket 324 together to seal the jacket 324 and the pipe insulation assembly 320 or section of the pipe insulation assembly 320 about a length of pipe 330 on which the pipe insulation assembly or section of the pipe insulation assembly has been mounted. The release strip 342 may be made of paper, polymeric film or other suitable strip material and has a release agent, such as but not limited to silicone, on the surface directly overlaying the adhesive 340 that permits the release strip to be easily peeled back and removed from the adhesive 340 immediately prior to sealing the lateral edge portions of the jacket 324 together to complete the installation of the pipe insulation assembly or a section of the pipe insulation assembly about a length of pipe 330.

A ruler 344 for measuring the length of pipe insulation section(s) made by transversely cutting the pipe insulation assembly 320 is formed by easily visible markings 346, in units of linear measurement, printed or otherwise formed on the inner surface of the flap formed by the second lateral edge portion of the jacket 324. The markings may be in English system units (e.g. at one inch or half inch increments) or metric units (e.g. at two or five centimeter increments). For example, like the ruler 144 of the first embodiment, the unit markings may be in one inch increments with each third marking having a numerical indicator wherein the numerical indicators follow a sequence that begins with 3 and incrementally increases by 3 from 3 to 12 after which the sequence is repeated for the length of the ruler. To size and install a section of the pipe insulation assembly 320, an installer merely has to measure the length of pipe to be insulated; read the ruler provided on the pipe insulation assembly to determine where the pipe insulation assembly should be transversely cut to form a pipe insulation section of the correct length; make the cut; and install the properly sized pipe insulation section. Since the ruler is located on the inner surface of the flap formed by the second lateral edge portion 338 of the jacket 324, the ruler is covered when the lateral edge portions of jacket are sealed together and there are no visible ruler markings on the installed section of pipe insulation to adversely affect the appearance of the insulated pipe.

The fourth embodiment 420 of the pipe insulation assembly of the subject invention that is shown in FIGS. 11, 12 and 13 includes a length of tubular insulation 422 and a jacket 424 overlaying and bonded by an adhesive 425 to the outer surface of the tubular insulation. The length of tubular insulation 422 has a wall with an outer cylindrical surface 426 and an inner cylindrical surface 428 for overlaying an outer surface of a length of pipe 430. In a preferred embodiment, a longitudinally and radially extending slit 432 extends from the outer surface to the inner surface of the wall and for the length of the wall so that the pipe insulation assembly 420 can be easily flexed open, passed over, and mounted on the length of pipe 430. Where the tubular insulation 422 is less flexible or more flexibility is desired for passing the pipe insulation assembly over a pipe, the slit 432 may also extend part of the way through a diametrically opposed portion of the wall to provide the pipe insulation assembly 420 with more flexibility for being opened, passed over, and mounted on a length of pipe 430 or the slit 432 may extend completely through a diametrically opposed portion of the wall to sever the tubular insulation 422 into two sections with the jacket 424 holding the sections together and providing the pipe insulation assembly with more flexibility for being opened, passed over, and mounted on a length of pipe 430.

The jacket 424 has a first lateral edge portion 434 that extends along a first outer edge of the slit 432 and has an intermediate portion 436 that passes around the outer surface of the tubular insulation 422 to a second lateral edge portion 438 of the jacket that is located in proximity to and extends for the length a second outer edge of the slit 432. The second lateral edge portion 438 forms a longitudinally extending flap for overlapping the slit 432 and the first lateral edge portion 434 of the jacket to seal the pipe insulation assembly 420 or a section of the pipe insulation assembly 420 about a length of pipe 430. A continuous or discontinuous strip or layer of adhesive 440 is located on an inner surface of the flap and extends for the length of the flap formed by the second lateral edge portion 438 of the jacket. As shown in FIG. 12, the strip or layer of adhesive 440 is used to bond the lateral edge portions 434 and 438 of the jacket 424 together, with the flap overlaying and sealing the slit 432, after the pipe insulation assembly 420 or a section of the pipe insulation assembly 420 has been mounted on a length of pipe 430. Preferably, the adhesive 440 is a pressure sensitive adhesive, such as but not limited to an acrylic adhesive, that enables the lateral edge portions 434 and 438 of the jacket 424 to be sealed together by pressing the adhesive on the inner surface of the flap formed by the second lateral edge portion firmly against the outer surface of the first lateral edge portion 434.

During the packaging, storage, shipment, and handling of the pipe insulation assembly 420 prior to installation, a release strip 442 overlays the adhesive 440 on the inner surface of the flap formed by the second lateral edge portion of the jacket 424 and protects the adhesive 440 from degradation that could otherwise be caused by an accumulation of dirt or water on or by the adhesive 440 prior to installation. The release strip 442 is removed from the adhesive 440 immediately prior to bonding the lateral edge portions of the jacket 424 together to seal the jacket 424 and the pipe insulation assembly 420 or section of the pipe insulation assembly 420 about a length of pipe 430 on which the pipe insulation assembly or section of the pipe insulation assembly has been mounted. The release strip 442 may be made of paper, polymeric film or other suitable strip material and has a release agent, such as but not limited to silicone, on the surface directly overlaying the adhesive 440 that permits the release strip to be easily peeled back and removed from the adhesive 440 immediately prior to sealing the lateral edge portions of the jacket 424 together to complete the installation of the pipe insulation assembly or a section of the pipe insulation assembly about a length of pipe 430.

A ruler 444 for measuring the length of pipe insulation section(s) made by transversely cutting the pipe insulation assembly 420 is formed by easily visible markings 446, in units of linear measurement, printed or otherwise formed on the first lateral edge portion 434 of the jacket. The markings may be in English system units (e.g. at one inch or half inch increments) or metric units (e.g. at two or five centimeter increments). For example, like the ruler 144 of the first embodiment, the unit markings may be in one inch increments with each third marking having a numerical indicator wherein the numerical indicators follow a sequence that begins with 3 and incrementally increases by 3 from 3 to 12 after which the sequence is repeated for the length of the ruler. To size and install a section of the pipe insulation assembly 420, an installer merely has to measure the length of pipe to be insulated; read the ruler provided on the pipe insulation assembly to determine where the pipe insulation assembly should be transversely cut to form a pipe insulation section of the correct length; make the cut; and install the properly sized pipe insulation section. Since the outer surface of the first lateral edge portion 434 of the jacket containing the ruler is covered by the second lateral edge portion 438 when the lateral edge portions of the jacket are sealed together, there are no visible ruler markings on the installed section of pipe insulation to adversely affect the appearance of the insulated pipe.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A pipe insulation assembly comprising:

a length of tubular insulation; the tubular insulation having a wall with an outer cylindrical surface and an inner cylindrical surface for overlaying an outer surface of a length of pipe; the wall having a length and a thickness; a longitudinally extending slit extending from the outer surface to the inner surface of the wall and for the length of the wall so that the tubular insulation can be passed over and mounted on a length of pipe; the slit having a first longitudinally extending outer edge and a second longitudinally extending outer edge;

a jacket overlaying the outer cylindrical surface of the wall; the jacket being bonded to the outer cylindrical surface of the wall; the jacket having a length; the jacket having a first lateral edge portion extending along the first longitudinally extending outer edge of the slit; the jacket having a second lateral edge portion, extending along the slit in proximity to the second outer edge of the slit, that forms a longitudinally extending flap for overlapping the slit and the first lateral edge portion of the jacket; adhesive on the one of the lateral edge portions of the jacket for bonding the lateral edge portions of the jacket together with the flap overlaying and sealing the slit after the pipe insulation has been mounted on a length of pipe; a release strip overlaying the adhesive, for protecting the adhesive from degradation prior to installation, which is removed immediately prior to bonding the lateral edge portions of the jacket together to seal the jacket and the pipe insulation about a length of pipe on which the pipe insulation has been mounted; a ruler means associated with the jacket, extending for the length of the jacket, and located along one of the lateral edge portions of the jacket; and the ruler means having units of linear measurement marked thereon for measuring the pipe insulation assembly in the direction of the length of the pipe insulation assembly to facilitate the cutting of the pipe insulation assembly to a shorter length.

2. The pipe insulation assembly according to claim 1, wherein:

the ruler means is associated with the jacket so that, through application of the pipe insulation assembly to a length of pipe, the ruler means is no longer a visible part of the pipe insulation assembly.

3. The pipe insulation assembly according to claim 2, wherein:

the ruler means is the release strip.

4. The pipe insulation assembly according to claim 3, wherein:

the adhesive is a pressure sensitive adhesive that extends along an inner surface of the longitudinally extending flap.

5. The pipe insulation assembly according to claim 4, wherein:

the units are marked on the ruler means in English system increments.

6. The pipe insulation assembly according to claim 4, wherein:

the units are marked on the ruler means in inch increments with each third mark having a numerical indicator; the numerical indicators follow a sequence that begins with 3 and incrementally increases by 3 from 3 to 12 after which the sequence is repeated for the length of the ruler means.

7. The pipe insulation assembly according to claim 4, wherein:

the units are marked on the ruler means in metric units.

8. The pipe insulation assembly according to claim 3, wherein:

the adhesive is a pressure sensitive adhesive that extends along on outer surface of the first lateral edge portion of the jacket.

9. The pipe insulation assembly according to claim 8, wherein:

the units are marked on the ruler means in English system increments.

10. The pipe insulation assembly according to claim 8, wherein:

the units are marked on the ruler means in inch increments with each third mark having a numerical indicator; the numerical indicators follow a sequence that begins with 3 and incrementally increases by 3 from 3 to 12 after which the sequence is repeated for the length of the ruler means.

11. The pipe insulation assembly according to claim 8, wherein:

the units are marked on the ruler means in metric units.

12. The pipe insulation assembly according to claim 2, wherein:

the adhesive is a pressure sensitive adhesive that extends along an inner surface of the longitudinally extending flap; and the ruler means is located on an outer surface of the first lateral edge portion of the jacket that is covered by the flap when the flap is bonded by the pressure sensitive adhesive to the first lateral edge portion of the jacket to overlay and seal the slit in the wall of the tubular insulation.

13. The pipe insulation assembly according to claim 12, wherein:

the units are marked on the ruler means in English system increments.

14. The pipe insulation assembly according to claim 12, wherein:

the units are marked on the ruler means in inch increments with each third mark having a numerical indicator; the numerical indicators follow a sequence that begins with 3 and incrementally increases by 3 from 3 to 12 after which the sequence is repeated for the length of the ruler means.

15. The pipe insulation assembly according to claim 12, wherein:

the units are marked on the ruler means in metric units.

16. The pipe insulation assembly according to claim 2, wherein:

the adhesive is a pressure sensitive adhesive that extends along an outer surface of the first lateral edge portion; and the ruler means is located on an inner surface of the longitudinally extending flap so that ruler means is covered when the flap is bonded by the pressure sensitive adhesive to the first lateral edge portion of the jacket to overlay and seal the slit in the wall of the tubular insulation.

17. The pipe insulation assembly according to claim 16, wherein:

the units are marked on the ruler means in English system increments.

18. The pipe insulation assembly according to claim 16, wherein:

the units are marked on the ruler means in inch increments with each third mark having a numerical indicator: the numerical indicators follow a sequence that begins with 3 and incrementally increases by 3 from 3 to 12 after which the sequence is repeated for the length of the ruler means.

19. The pipe insulation assembly according to claim 16, wherein:

the units are marked on the ruler means in metric units.

* * * * *